(12) United States Patent
Taylor

(10) Patent No.: US 6,901,396 B1
(45) Date of Patent: May 31, 2005

(54) PACKED RADIX SEARCH TREE IMPLEMENTATION

(75) Inventor: Bradley L. Taylor, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 09/672,170

(22) Filed: Sep. 27, 2000

(51) Int. Cl.[7] .............................................. H04L 12/28
(52) U.S. Cl. ...................................... 707/2; 370/395.32
(58) Field of Search ........................... 370/395.32, 400, 370/408; 707/100, 1–8, 200; 708/542; 710/49; 711/117–9, 216

(56) References Cited

U.S. PATENT DOCUMENTS

| | | | | |
|---|---|---|---|---|
| 5,666,528 A | * | 9/1997 | Thai | ............................ 707/102 |
| 5,907,848 A | * | 5/1999 | Zaiken et al. | ................ 707/202 |
| 5,978,792 A | * | 11/1999 | Bhargava et al. | ............... 707/2 |
| 6,167,393 A | * | 12/2000 | Davis et al. | .................... 707/3 |
| 6,185,557 B1 | * | 2/2001 | Liu | ............................... 707/4 |
| 6,490,548 B1 | * | 12/2002 | Engel | .......................... 704/10 |
| 2003/0200452 A1 | * | 10/2003 | Tagawa et al. | .............. 713/193 |

* cited by examiner

Primary Examiner—David Vincent
(74) Attorney, Agent, or Firm—Blakely, Sokoloff, Taylor & Zafman LLP

(57) ABSTRACT

A packed radix data system is described, the packed radix data system including packed nodes which include a base pointer and an existence field, the existence field having a number of bits which indicate the existence or non-existence of a possible child node. By counting the number of bits to the left of an indexed bit in the existence field, an offset value is determined. The offset value is combined with the base pointer value to determine the child node address.

12 Claims, 8 Drawing Sheets

| level | Key bits used as index | Node type | Child type |
|---|---|---|---|
| 0 | Key[31:20] | Top-node | Packed |
| 1 | Key[19:16] | Packed | Packed |
| 2 | Key[15:12] | Packed | Packed |
| 3 | Key[11:8] | Packed | Packed |
| 4 | Key[ 7: 4] | packed | Packed |
| 5 | Key[ 3: 0] | packed | data |
| 6 |  | data | - |

FIGURE 4

PACKED RADIX SEARCH TREE IMPLEMENTATION

BACKGROUND OF THE INVENTION

1. Field of the Invention

The present invention relates to search tree data structures.

2. State of the Art

In order to efficiently and quickly locate information within a data structure, elements within the data structure are often put in a particular order (i.e., sorted data structure) and an algorithm is employed to locate elements within the structure. The search is generally performed in a reiterative manner such that in a first interval (or iterative loop), the whole structure is searched, in the next interval a sub-set of the structure is searched, in the next interval, a sub-set of the previous sub-set is searched, and so on. Data structures are often sorted by keys, where a unique key is associated with each element within the data structure. For instance, to sort customer records alphabetically, the key is the last name, however, the other information, such as address, phone number, work number, do not matter in sorting the records alphabetically. In this case, the data structure is searched using the key (i.e., the last name) to obtain the data associated with each key (i.e., the address, etc.).

In a specific data structure, referred to as a binary search tree, the structure is made up of a plurality of nodes (FIG. 1). Keys in a binary search tree are binary numbers made-up of "1"s and "0"s. Stored at one type of node location are a binary key and two address pointers each pointing to a new node are stored. At another type of node location, a key and data (e.g., address, phone number, work number, etc.) is stored. A basic search of a binary search tree consists of comparing one or more bits of an input key to corresponding one or more bits of the data structure keys.

Hence, to search a binary search tree, in a first iteration the whole structure is searched. In the second iteration the search is halved and so on.

A binary search tree is a binary tree where every node's left subtree has values less than the nodes's value, and every right sub-tree has values greater. A new node is added as a leaf. A node is a unit of reference in a data structure, also called a vertex in graphs and trees. It is also a group of information which must be kept at a single memory location. A tree is a data structure accessed beginning at the root node. Each node is either a leaf or it is a parent which refers to child nodes. More formally, a connected forest. Contrary to a physical tree, the root is usually depicted at the top of the structure, and the leaves are depicted at the bottom. A root is the distinguished initial or fundamental item of a tree. The only item which has no parent. A parent is an item of a tree which refers to one or more child items which are conceptually on the next level "down" or farther from the root. A child is an item of a tree referred to by a parent item. Every item, except the root is the child of some parent. A leaf is a terminal or "bottom" item of a tree, i.e., an item with no child. More formally, a vertex with degree one.

Data structures may also be sorted by groups, referred to as radix sorting. For instance, in the above example in which the key is a "last name", the data structure may be initially searched for the first letter of the key, such as the letter "Q". This search would provide a pointer or index into a group of keys starting with "Q". The next search might be of the second letter and so on.

A radix search using a binary key is performed by taking groups of bits of the binary key and comparing them to a corresponding number of bits of the key at each node. A radix 2 search compares one bit of the key at a time, radix 4 compares two bits at a time, a radix 16 compares four bits at a time.

The advantage of a binary search is that if you have a very sparse search and a large key (i.e., many bits), it works well/efficiently because each iteration of the search halves the total nodes to search. However, if the data structure includes a large number of nodes, it becomes more efficient to perform a radix search. Specifically, when performing a search, each search has an associated compare operation between the input key and the keys at each node. Each compare operation requires reading each 16-bit key from memory representing addition cycles for performing the search. For instance, if a 16-bit key is used to search a 400 node data structure (i.e., sparse search), fewer compares operations will be required, and hence comparing two 16-bit keys does not represent a large penalty to system operation. However, if the data structure is not sparse, for instance 64,000 nodes, the number of compares of a large key becomes computationally unwieldy.

SUMMARY OF THE INVENTION

A system and method of searching a Packed Radix Tree data structure in which the data structure includes first, second, and third types of nodes. The first node type (Top Node) stores a first pointer such that the top layer of the data structure is an indexable table of first pointers. Each of the first nodes's pointers point to a second node type. The second node type, (Packed Node), includes an existence field and a second pointer. The pointer in each Packed Node is either a pointer base that points to the beginning of a list of Child Packed Nodes or the third node type data nodes. The existence field of the Packed Node provides information indicating which of the possible child nodes exists. The existence field is also used to determine pointers to the existing child nodes. The third node type is the terminal Data node which stores data.

The data structure is searched using a search key having a plurality of sub-key fields. Searching the Packed Radix tree data structure entails performing iterative search cycles resulting in either: 1) the generation of a pointer to a current node, 2) the termination of the search at a terminal data node, or 3) the termination of the search with no returned data.

BRIEF DESCRIPTION OF THE DRAWINGS

The present invention may be further understood from the following written description in conjunction with the appended drawings. In the drawings:

FIG. 4 is a table of one embodiment of a packed radix tree;

DETAILED DESCRIPTION OF THE PREFERRED EMBODIMENTS

Figure 1:
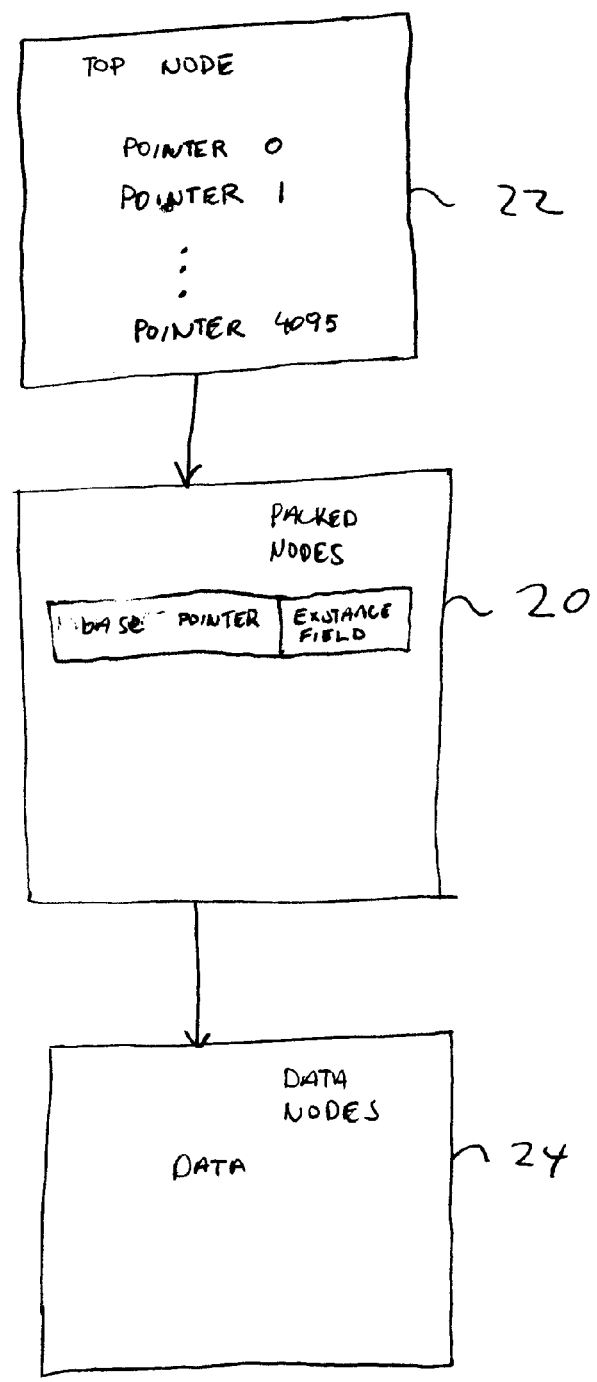
FIG. 1 is a diagram of different nodes for a packed node data structure.

FIG. 1 is a general representation of the packed radix data structure. The packed radix data structure includes a number of packed nodes 20. Each of the packed nodes includes a base pointer and an existence field. As described below, the base pointer and existence field can be used along with an index from a key to determine the next node in the structure. In a preferred embodiment, the top node 22 is a table which points to a number of children nodes; in these cases the children nodes are packed nodes. The use of a table as the top node is efficient. In many situations, for most of the table entries of the top node, there is at least one key value in the data structure.

The data structure preferably has a number of layers of the packed nodes 20. At the bottom of the data structure are a number of data nodes 24 which contain the data for the data structure.

Figure 2:
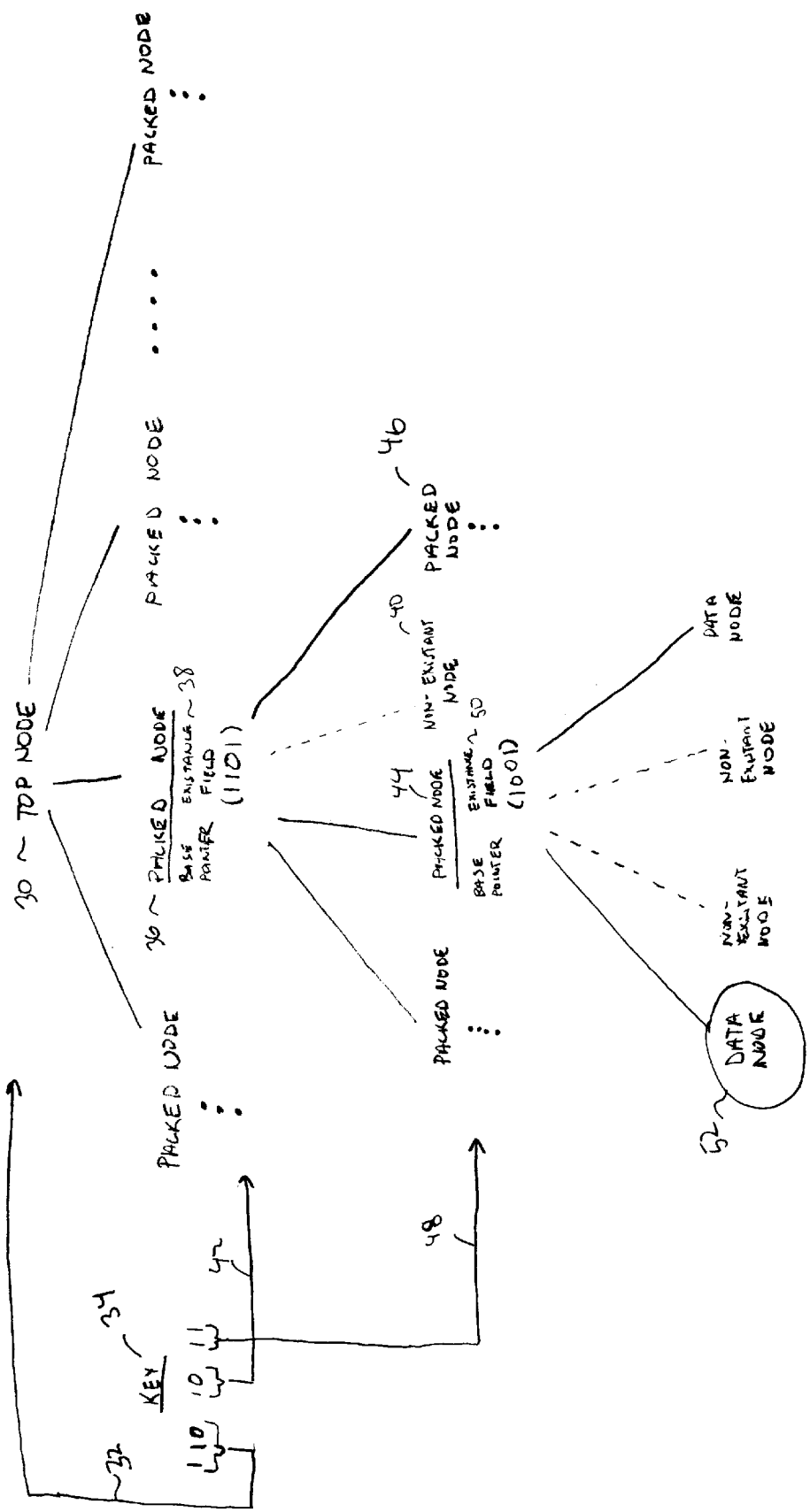
FIG. 2 is a diagram of a simplified packed node system of one embodiment of the present invention.
Figure 3:
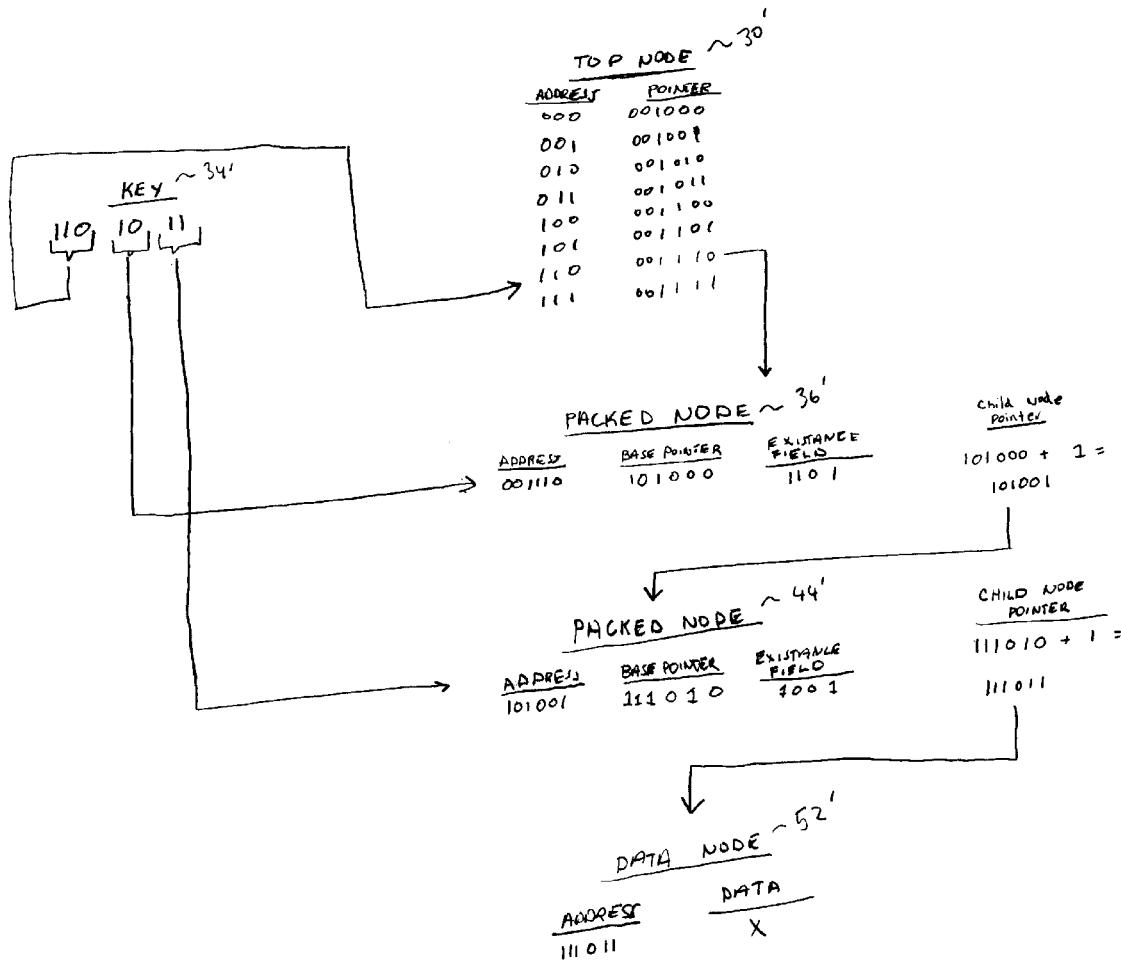
FIG. 3 is a diagram illustrating one embodiment of the simplified packed radix data structure of FIG. 2.

The operation of the data structure is better understood with respect to the simplified example of FIGS. 2 and 3. As shown in FIG. 2, the top node table 30 is accessed by the subfield 32 of the key 34. One of the entries of the top nodes table indexed by the subfield key value 32 points to a specific packed node, in this case the packed node 36. The packed node 36 includes a base pointer and an existence field. Note that the existence field 38 indicates that some of the potential children nodes are nonexistent, such as nonexistent node 40. Nonexistent nodes are not stored in the data structure.

The use of the existence field 38 allows for the nonexistent nodes to be skipped, as will be described below. The subkey 42 indicates the packed node for the children node. In this case the children node is node 44. Since the third bit of the existence field is a 1, this means that the children packed node 44 exists. In one embodiment, the address of packed node 44 is determined by counting the number of 1's to the left of the bit in the existence field indexed by the subkey 42. In this case, there is one bit to the left of the third bit. Thus one is added to the base pointer value to point to the packed node 44. Note that, using this address scheme, packed node 46 is stored adjacent to the packed node 44, skipping the nonexistent node 40. This helps the data structure to be stored in a relatively small space, since the nonexistent nodes are not stored in the data structure.

The subkey field 48 is used as an index to the existence field 50. The $4^{th}$ bit of the existence field 50 is a 1, meaning that the node indexed by the sub-field exists. In one embodiment, the address of the child node is determined by counting the number of "1" bits to the left of the indexed bit in the existence field, in this case, one. Adding one to the base pointer, the child node 52 is addressed. Child node 52 is a data node which contains data corresponding to the key value 34. Note that the offset value to the base pointer is preferably determined by the size of the nodes in the data structure. If multiple memory locations are required by an entry, the addressing is changed accordingly.

FIG. 3 illustrates the computation of the example of FIG. 2 for exemplary address values.

FIG. 4 is a table that illustrates the arrangement of a packed radix 16 tree. In this example, in level zero, the top 12 bits of the key are used as an index to the top node table. Each entry in the top node table points to a child node, in this case a packed node. The subkey field for levels 1, 2, 3, 4, 5 are packed nodes, using the base pointers and existence field as described above. In these packed nodes, the 4-bit index is used along with the 16-bit existence field to point out existent and nonexistent child nodes. Note that the existence field of the top level packed nodes will tend indicate more child nodes than the bottom levels of the data structure. An advantage of the packed radix data structure is that it allows for the data structure to be more compact than typical radix data structures. The calculation of the child node address using the existence field and the index is done relatively quickly and efficiently on a reconfigurable logic system, which makes the packed radix system of the present invention particularly effective when implemented on reconfigurable logic.

Figure 5:
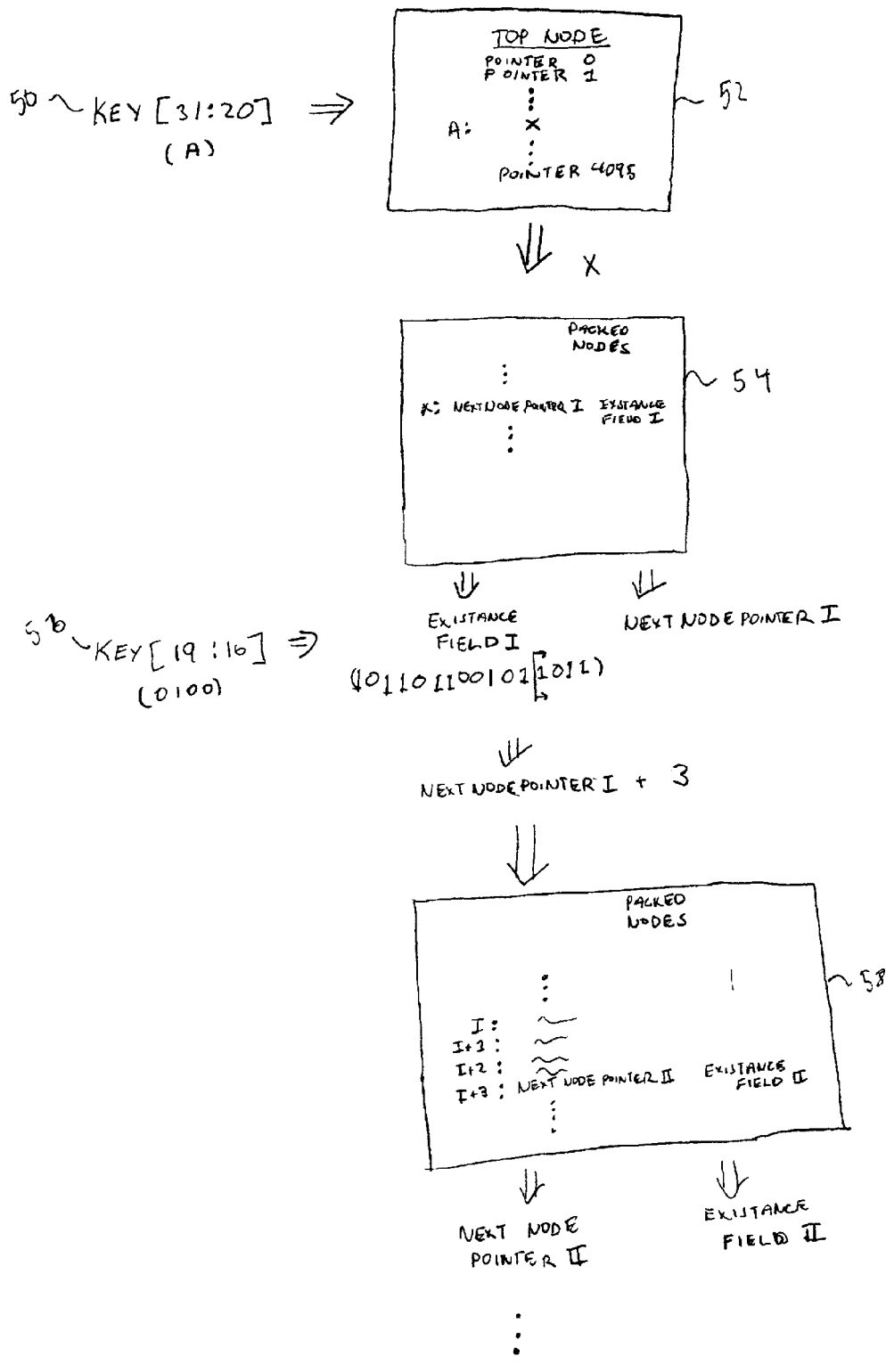
FIG. 5 is a partial diagram illustrating one embodiment of a packed radix tree for a packed radix 16 embodiment.

FIG. 5 is a portion of a packed radix system implementing one embodiment of the system of the present invention. Key field 50 is an index to the top node table 52. In one embodiment when the key field 50 has 12 bits and there are 496 entries in the top node table 54. The value of key 50 is then used to determine the address for the packed node X in the group of packed nodes 54. The key value 56 is used to point to a bit; in this case the key 56 points to the fifth bit in the existence field of X. Counting all the high bits to the left of the fifth bit, three bits are found. Combining the next node pointer 1 with three, the address of the next child packed node, node 58, is determined.

Figure 6:
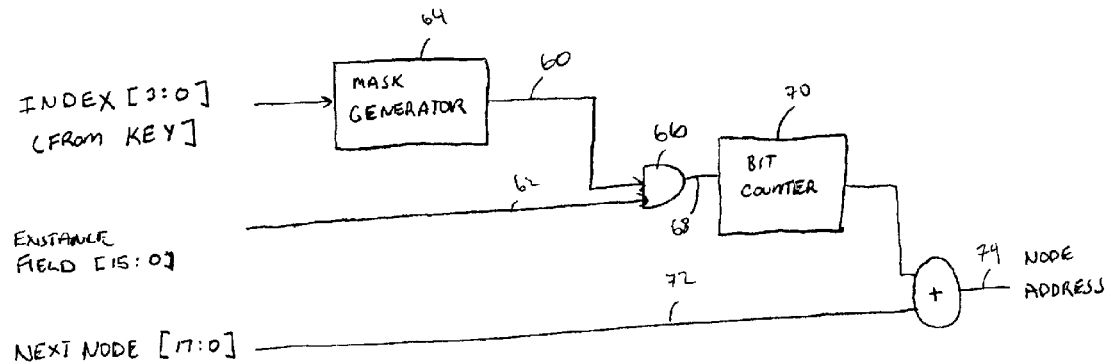
FIG. 6 is a diagram of circuitry for node address calculation.

FIG. 6 is an example of logic which can be used to implement the determination of the child nodes of packed nodes. The index value is sent to a mask generator 64 which produces a mask value on line 60. Tthe mask value on line 60 is masked with the existence field 62 and sent to a multiple-input AND 66. The output of the multiple-input AND on line 68 in one embodiment contains only the bits to the left of the bit pointed to by the index which is obtained from the key. The bit counter 70 counts the number of bits in the mask value on line 68, and this value is AND'ed to the next node value on line 72 to get the next node address on line 74.

Figure 7:
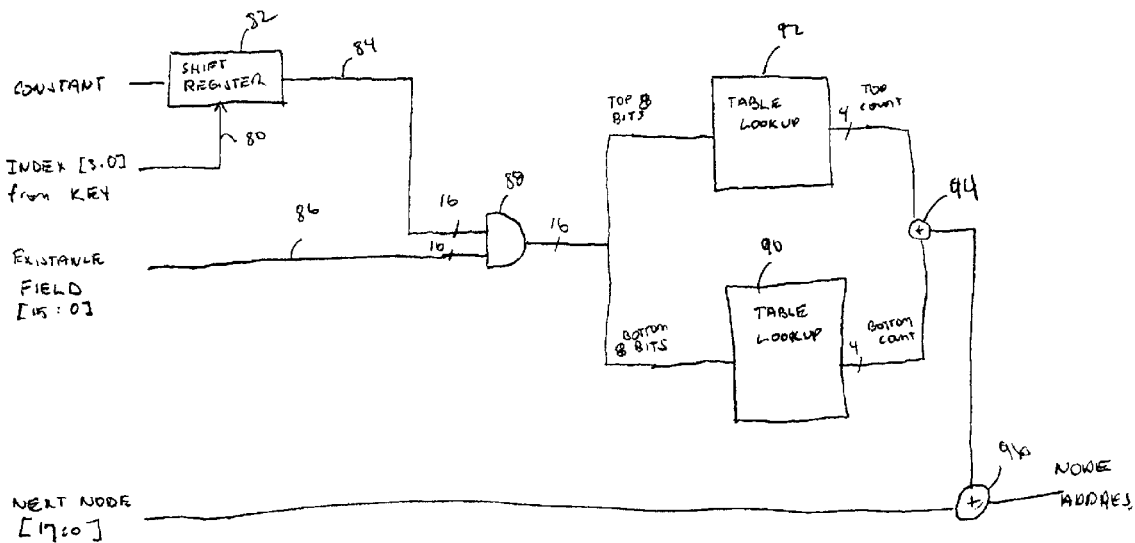
FIG. 7 is one implementation of the node address calculation circuitry of FIG. 6 as implemented on reconfigurable logic.

The node calculation can be done quite effectively on a reconfigurable logic system, as shown in FIG. 7. The index on line 80 causes the shifting of a shift register 82 to produce a mask value on line 84. This mask value is masked with the existence field value 86 in the multiple-input AND 88. In one embodiment, the output of the multiple-input AND 88 is split into two lines for two table lookups, table lookups 90 and 92. Table lookups 90 and 92 implement a lookup table which is preferably an 8-bit address with a four-bit output, which indicates the number of bits which are high among the top eight and bottom eight bits. These two counts are combined in adder 94, and the total bit count added to the next node base address with adder 96.

Figure 8:
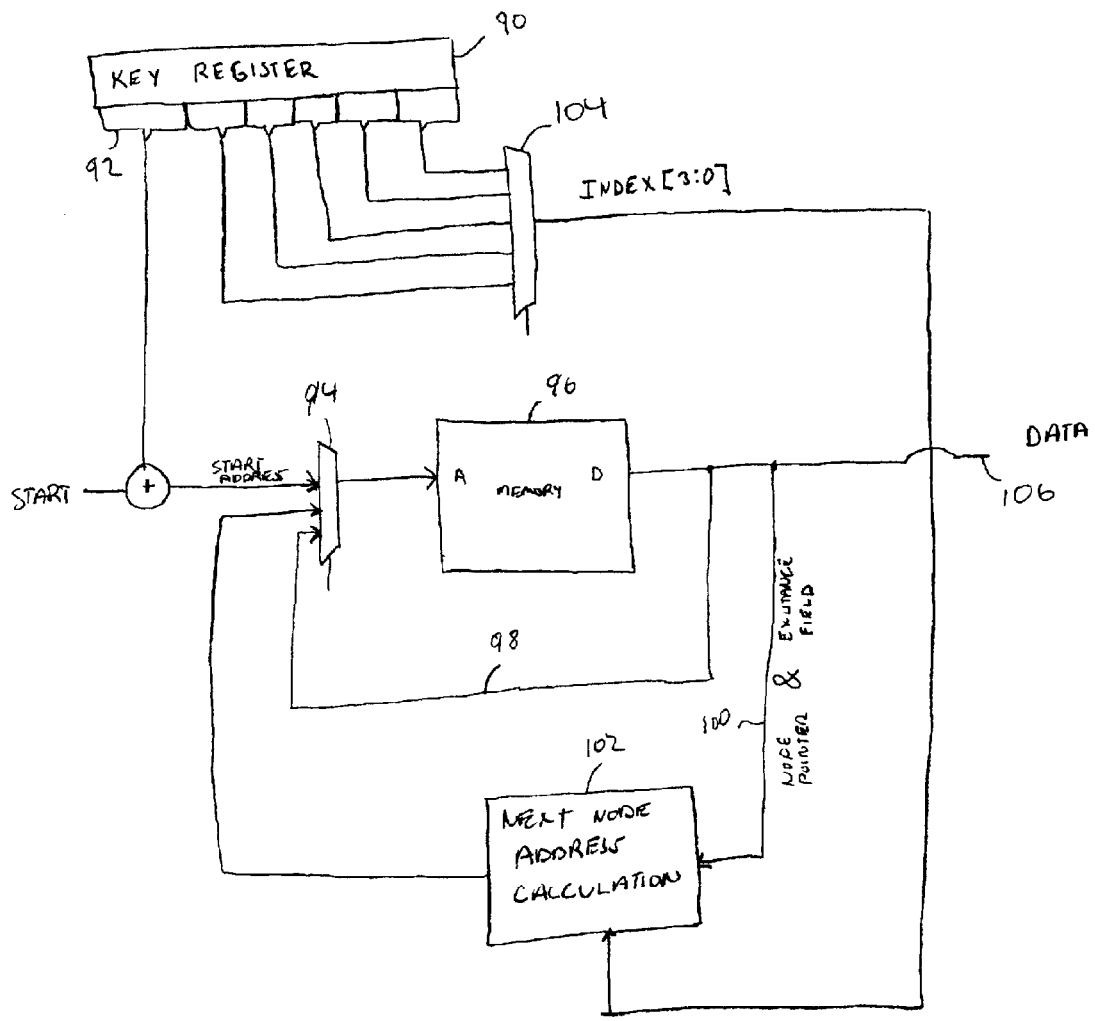
FIG. 8 is a diagram of circuitry to do the packed radix data search.

FIG. 8 illustrates one implementation of the packed radix data structure search. A key register 90 stores the key to be searched. Key field 92, in one embodiment the top 16 bits, is added to a start address base to find an index to find the first packed node. A multiplexer 94 provides this value to the memory search 96, which outputs the pointer to the packed node on line 98. When this data is sent through the multiplexer 94 to the memory, the output is the node pointer and existence fields on line 100. This information, along with the correct index information, is sent to the next node address calculation box 102, such as that shown with respect to FIGS. 6 and 7. These calculate the next node address. This data is sent to the multiplexer 94 which then produces the next level in the data structure. The correct index is provided by the multiplexer 104. Note that the system of FIG. 8 illustrates how the next node calculation block 102, such as that shown in FIGS. 6 and 7, can be reused for each step in the packed radix data structure calculation. The bottleneck in the embodiment of FIG. 8 is the memory access to memory 96. For this reason, the system can be speed up if multiple key searches are done by interleaving each of the steps of the searches.

Figure 9:
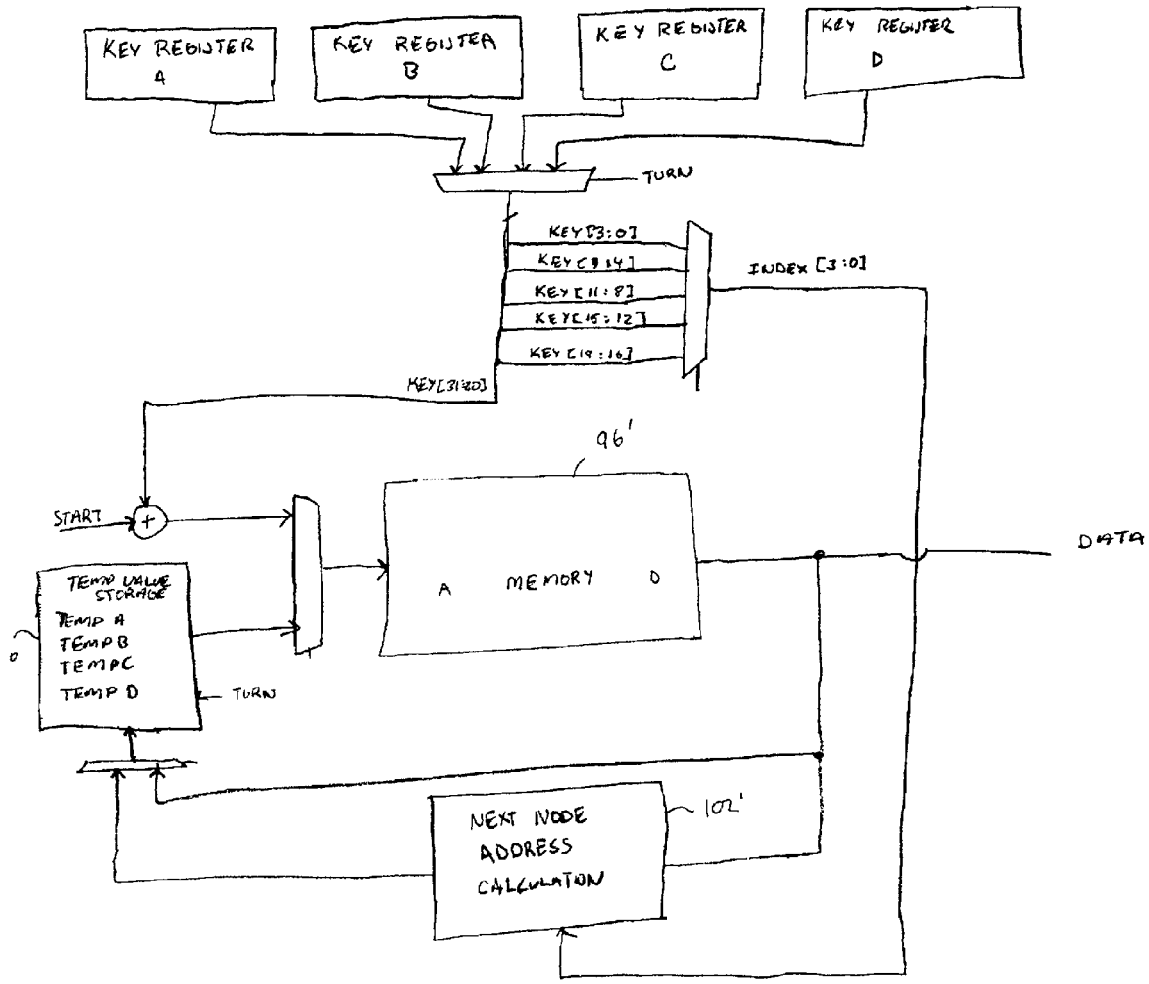
FIG. 9 is a diagram of circuitry to do an interleaved packed radix data search.

FIG. 9 illustrates a structure to implement such an interleaving. In the example shown in FIG. 9, the output of the next node address calculation 102' or the memory 96' is stored in a temp value storage 110 that allows multiple key searches to be done, each of the steps being interleaved with one another.

In the preceding description, numerous specific details are set forth, such as specific functional elements or processing system structure in order to provide a thorough understanding of the present invention. It will be apparent, however, to one skilled in the art that these specific details need not be employed to practice the present invention. In other instances, well known processing system operation and theory have not been described in order to avoid unnecessarily obscuring the present invention.

Moreover, although the components of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recite only those features regarded as essential to the invention.

What I claim is:

1. A data structure comprising:
   packed nodes including a base pointer value and an existence field, the existence field indicating the existence or non-existence of child nodes for a number of possible child nodes, the existence field being indexed by a portion of a key to determine an offset value, the offset value and the base pointer value being combined to produce a pointer to the correct child node, wherein of the possible child nodes only child nodes whose existence is indicated by the existence field are stored in the data structure.

2. The data structure of claim 1 wherein the determining of the offset value includes counting existence bits.

3. The data structure of claim 2 wherein the offset value is determined by counting existence bits on one side of an indexed position to obtain the offset value.

4. The data structure of claim 1 further comprising a top node, the top node being a table pointing to packed node values.

5. The data structure of claim 1 further comprising data nodes, each of the data nodes being a child node of a packed node.

6. The data structure of claim 1 wherein the index is 4 bits of key, and wherein the existence field is 16 bits long, such that the data structure comprises a packed radix 16 data structure.

7. The data structure of claim 1 wherein some of the packed nodes point to child nodes which are also packed nodes.

8. The data structure of claim 1 wherein the data structure has a number of levels.

9. The data structure of claim 8 wherein the levels include a top node level, a bottom data node level, and a number of packed node levels.

10. The data structure of claim 9 wherein there are five packed node levels.

11. A data structure stored in a digital storage area which is searchable by a digital search key including a plurality of sub-key fields, said data structure comprising:
   a plurality of top nodes, each having an associated location in said storage area for storing a first pointer, wherein one of said plurality of top nodes is indexable within said storage area using a first one of said sub-key fields;
   a plurality of packed nodes, each stored in a location within said storage area which is pointed to by a corresponding one of said first pointers, and said each packed node including an existence field and a second pointer, said second pointer, in a first case, pointing to the beginning of the location of a list of next-Packed Nodes in said storage area and, in a second case, pointing to the beginning of the location of a data field in said storage area, said existence field being indexed by a unique one of said plurality of sub-key fields so as to determine whether any node of said list of next-Packed Nodes is a child node of said each packed node and being indexed so as to generate a binary index value for indexing into, in said first case, said location of said list of next-Packed Nodes to determine a new Packed Node and in said second case, said location of said data field;
   a plurality of terminal nodes, each having an associated location within said storage area for storing a different data field.

12. A method of searching a data structure with a search key word including a plurality of sub-key fields, said data structure being stored in a digital storage area and including a plurality of top nodes, each having an associated location in said storage area for storing a first pointer, a plurality of packed nodes each having an associated location in said storage area for storing an existence field and a second pointer, said second pointer pointing to, in a first case, the beginning of the location in said storage area of a list of next packed nodes, and in a second case, the beginning of the location in said storage area of a data field, a plurality of terminal nodes, each having a location within said storage area for storing one of a plurality of said data fields, said method comprising the steps of:

a) matching a first sub-field key of said search key word to said associated location of one of said plurality of top nodes for accessing said first pointer of said one top node;

b) matching said accessed first pointer to said associated location of a current one of said plurality of packed nodes for accessing said existence field and said second pointer of said current packed node;

c) using a unique sub-field key of the search key to index into said existence field of said current packed node to obtain existence field information;

d) using said information to determine if any of the next packed nodes in said list are children nodes of said current packed node;

e) using said information along with said unique sub-field key to determine an index value if any of said next packed nodes in said list are said children nodes, wherein if no children nodes exist said search is terminated;

f) in said first case, determining a new current packed node pointer by adding said index value to said second pointer, said current packed node pointer pointing to said location of said one of said next packed nodes;

g) in said second case, determining a new pointer by adding said index value to said second pointer, said new pointer pointing to said location of one of said plurality of data fields and terminating said searching of said data structure;

h) performing steps c)–g) for each new current packed node;

i) terminating said search if none of said next packed nodes are children of the current packed node.

* * * * *